Dec. 14, 1948.   A. J. PENICK   2,456,081
WELL HEAD SEAL
Filed Nov. 2, 1945   2 Sheets-Sheet 2

Inventor
Arthur J. Penick
By
E. V. Hardway
Attorney

Patented Dec. 14, 1948

2,456,081

UNITED STATES PATENT OFFICE 2,456,081

WELL-HEAD SEAL

Arthur J. Penick, Houston, Tex., assignor to Oil Center Tool Company, Houston, Tex., a corporation of Texas Application November 2, 1945, Serial No. 626,333

1 Claim. (Cl. 285—22)

This invention relates to a well head seal.

An object of the invention is to provide a novel type of seal for sealing between concentric parts of a well head structure.

The seal is adapted for use in forming a fluid tight seal between the parts of the well head as well as between the head and pipe therein.

While the type of seal herein described has been specially designed for use in well head structures it is also capable of efficient use generally to seal between concentric parts.

A further object of the invention is to provide a seal which includes an assembly of superimposed nested metal rings which, in a preferred form thereof, are confined between wear rings.

It is a further object of the invention to provide an annular seal which includes superimposed metal rings which are substantially, similarly, arched to an apex, in cross-section with the outer and inner margins of the rings defining cylindrical contours.

It is a further object of the invention to provide a seal formed of rings shaped and asssembled, as above described, and which gradually increase in thickness from their apexes each way outwardly so that there will be provided spaces between the rings to allow the rings to be moved closer together, so that the seal will be expanded upon the application of an endwise compressive force thereto.

Figure 1:
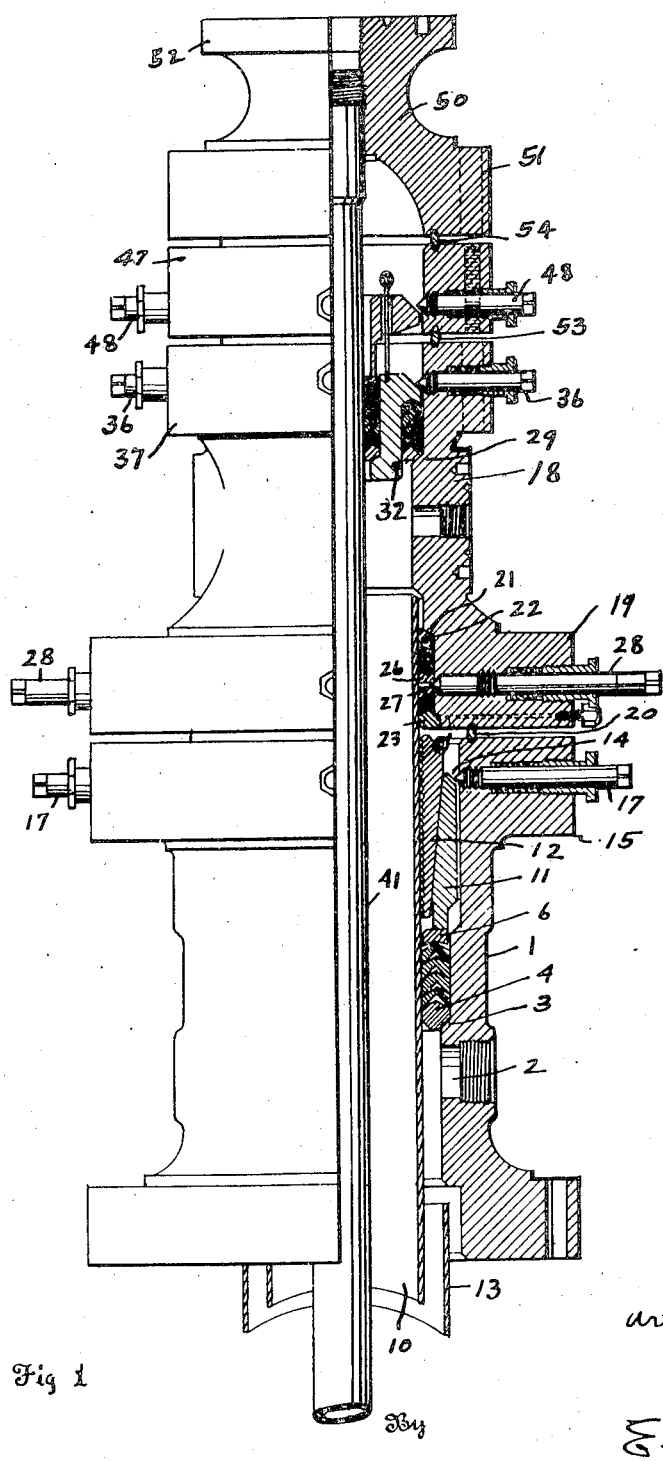
Figure 2:
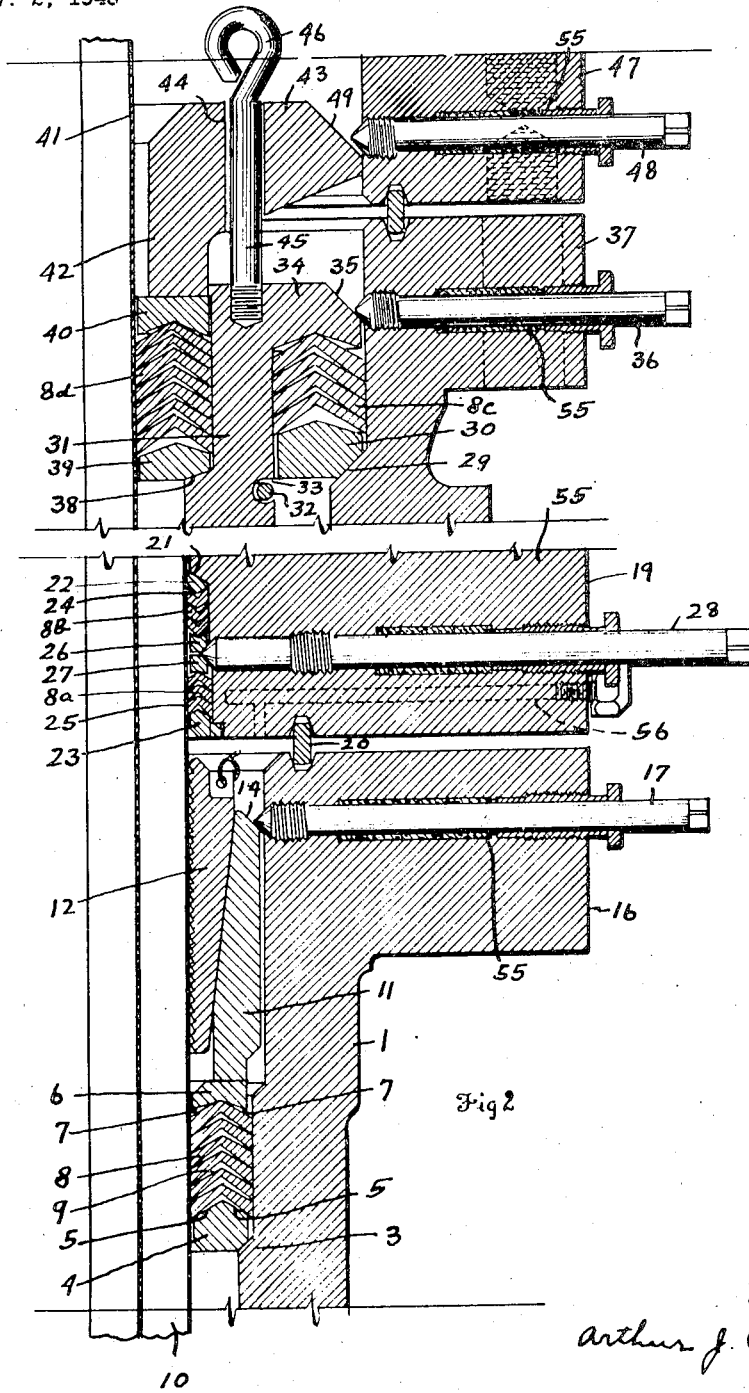

With the above and other objects in view the invention has particular relation to certain novel features of construction, arrangement of parts and use, examples of which are given in this specification and illustrated in the accompanying drawings, wherein:

Figure 1 is a side elevation of a well head, partly in section, illustrating the invention; and Figure 2 is an enlarged fragmentary, vertical, sectional view.

Referring now more particularly to the drawings wherein like numerals of reference designate the same parts in each of the figures, the numeral 1 designates a casing head having one or more outlet ports 2 for the connection of a flow line thereto and above the port said head has an inside annular downwardly and inwardly tapering seat 3 on which the lower metal wear ring 4 is seated. The upper face of the wear ring 4 tapers upwardly from each side forming the side faces 5, 5 which terminate at an apex, as clearly shown in Figure 2.

Spaced above the lower wear ring 4 is the upper wear ring 6 whose upper surface is plane and whose lower face is formed with the downwardly converging side faces 7, 7.

Between the upper and lower wear rings there is a seal comprising an assembly of nested, superimposed, rings 8. preferably formed of metal. These rings are arched in cross-section, as shown. Preferably they are arched to an apex and from said apex they gradually increase in thickness, that is in vertical dimension, from their apexes each way outwardly so that they are thicker at their margins than at their apexes. This provides spaces 9 between the rings and between the lower ring and the lower wear ring 4.

Their margins define cylindrical contours so that their outer margins seal against the inside of the casing head 1 and their inner margins seal against the well pipe 10 which is supported by the casing head.

Supported on the upper wear ring 6 there is a slip bowl 11, preferably formed of two vertical sections and whose inner side converges downwardly and inwardly to receive the wedge shaped slips 12 whose inner sides are toothed and engaged with and support the well pipe 10.

The surface casing 13, shown in Figure 1, is supported by a bradenhead beneath the casing head (not shown) in a similar manner as the well pipe 10 is supported from the casing head.

The upper end of the slip bowl has the downwardly and outwardly tapered annular bearing face 14. The upper end of the casing head is formed with an external annular flange 15 and extending radially through said flange are the lock down bolts 17 which have a threaded connection with the casing head and whose inner ends are cone shaped and bear against the face 14, as clearly shown in Figure 2. Should a leak develop past the seal beneath, the lock down bolts 17 may be screwed inwardly and the slip bowl 11 thereby forced downwardly increasing the compressive force against the seal and expanding the rings 8 thereof to stop the leak.

The upper end of the pipe 10 may be extended above the casing head and into the tubing head 18 mounted thereon. The lower end of the tubing head has an external annular flange 19 which registers with the flange 15 and these flanges may be secured together in an obvious manner by bolts (not shown). The facing sides of the flanges 15 and 19 have registering grooves in which the seal ring 20 is seated.

The lower end of the tubing head has an inside downwardly facing seat 21 against which the upper metal wear ring 22 is seated and screwed into the lower end of the tubing head there is a metal gland 23. The upper wear ring 22 and the lower gland 23 form, in effect, an annular groove around the lower end of the tubing head in which a special type of annular seal is seated and which will now be described:

The lower face of the upper wear ring 22 is tapered outside and inside to form a downwardly directed annular apex 24 and the upper face of the gland 23 is upwardly tapered on each side forming the annular upwardly directed apex 25. There is also an intermediate pair of upper and lower wear rings 26 and 27. Between the lower wear ring 27 and the gland 25 there is a superimposed series of nested metal rings 8a similar to the rings 8 and between the upper wear ring 22 and the intermediate wear ring 26 there is a series of superimposed metal rings 8b similar in shape to the rings 8 but arranged reversely, that is with their apexes downwardly. The outer sides of the intermediate wear rings 26 and 27 have the diverging tapering faces and extending radially through the flange 19 are the lock down bolts 28 which have a threaded connection with the flange 19 and whose inner ends are cone shaped and bear against the diverging faces of the wear rings 26 and 27. The outer and inner margins of the rings 8a, 8b define cylindrical contours and fit against the inside of the tubing head and around the pipe 10, respectively, and form seals therewith. The lock down bolts 28 may be screwed inwardly and the wear rings 26, 27 forced apart and an endwise compressive thus exerted against the ring assemblies 8a and 8b to cause an expansion thereof and to give a better sealing effect.

The upper end of the tubing head has an inside upwardly facing seat 29 on which there is seated the lower wear ring 30 shaped substantially similar to the wear ring 4 and fitted through the wear ring 30 there is a tubular gland 31 which is preferably formed of similar sections which are maintained assembled by a ring 32 therearound and seated in an external annular groove therein.

The upper end of the gland has an external annular flange 34 spaced above the wear ring 30 and between them there is an assembly of superimposed, nested, rings 8c similar to the rings 8 whose outer margins are in sealing relation with the tubing head and whose inner margins are in sealing relation with the gland 31. The flange 34 has an external, annular, downwardly and outwardly tapering face 35 and bolts 36 extended radially through an external annular flange 37 at the upper end of the tubing head and have a threaded connection therewith and their inner ends are conical shaped so that when they are screwed inwardly they will force the gland 34 downwardly and apply an endwise compressive force to the seal between the wear ring 30 and the flange 34 and expand the rings thereof.

The gland 34 has an inside annular upwardly facing shoulder 38 on which the wear ring 39 is mounted. This wear ring is of substantially the same shape as the wear ring 4 and mounted on it is a seal composed of the superimposed rings 8d similar in shape to the rings 8 and on this assembly of rings 8d there is the upper wear ring 40 approximately of the same shape as the wear ring 6. Mounted on the wear ring 40 and surrounding the well tubing 41 there is a gland 42 having a relatively wide, upper end flange 43 provided with the vertical openings 44 through which rods 45 extend. The lower ends of these rods are screwed into the upper end of the gland 31 and their upper ends are formed with eyes 46 forming means for lowering the gland assembly into the tubing head. The tubing head also includes a flange 47 which may be bolted into the assembly and extending radially through the flange 47 are the bolts 48 which have threaded connections with the flange 47 and whose inner ends are conical shaped and bear against an outside outwardly and downwardly tapering face 49 of the flange 43 so that when the bolts 48 are screwed inwardly they will force the gland 42 downwardly and expand the seal formed of the rings 8d. The margins of these rings 8d form seals with the inside wall of the gland 31 and the tubing 41.

The upper end of the tubing head is formed into a tubing hanger 50 to which the upper end of the tubing 41 is connected and whose lower end has an external annular flange 51 which is supported on the flange 47 and whose upper end is formed with an external annular flange for supporting the Christmas tree.

Between the flanges 37 and 47 there is an annular seal ring 53 which is seated in registering grooves in said flanges and between the flanges 47 and 51 there is an annular seal ring 54 which is seated in registering grooves in said flanges.

The bolts 17, 28, 36 and 48 are sealed with their respective flanges. These seals are illustrated as conventional stuffing boxes 55.

The flange 19 is provided with a radially extended duct 56 therethrough whose inner end terminates in the space between the seal ring 20 and the seals around the pipe 10 above and beneath said space. Test fluid may be introduced into said space through the duct 56 to test said seals for leakage.

The drawings and description are illustrative merely while the broad principle of the invention will be defined by the appended claim.

What I claim is:

In a well head assembly having concentric parts spaced apart, the outer part having an inside, annular, upwardly facing seat and the inner part having an external annular flange spaced above said seat, a wear ring on the seat, an assembly of superimposed, nested seal rings between the wear ring and flange, said inner part having an inside, annular, upwardly facing shoulder, a lower wear ring on said shoulder, an upper wear ring spaced above the lower wear ring, an assembly of seal rings between said lower and upper wear rings, an annular gland concentric with the inner part and bearing against the upper wear ring and means for forcing the inner part and the gland, respectively, against the corresponding seal ring assemblies.

ARTHUR J. PENICK.

REFERENCES CITED

The following references are of record in the file of this patent:

UNITED STATES PATENTS

| Number | Name | Date |
| --- | --- | --- |
| 917,690 | Weise | Apr. 6, 1909 |
| 1,834,506 | Stukenborg | Dec. 1, 1931 |
| 1,973,809 | Heggem | Sept. 18, 1934 |
| 2,006,602 | Muster | July 2, 1935 |
| 2,029,598 | Timbs et al. | Feb. 4, 1936 |
| 2,041,586 | Brazen | May 19, 1936 |
| 2,075,947 | Kennedy | Apr. 6, 1937 |
| 2,264,147 | Dunlevy | Nov. 25, 1941 |
| 2,313,169 | Penick et al. | Mar. 9, 1943 |

FOREIGN PATENTS

| Number | Country | Date |
| --- | --- | --- |
| 44,486 | Sweden | 1917 |
| 187,166 | Germany | May 12, 1906 |